United States Patent
Sogaard et al.

(10) Patent No.: US 11,549,871 B2
(45) Date of Patent: Jan. 10, 2023

(54) APPARATUS AND METHOD FOR ISOLATION AND/OR PREPARATION OF PARTICLES

(71) Applicant: H. Lundbeck A/S, Valby (DK)

(72) Inventors: Steen Sogaard, Valby (DK); Tommy Carsten Lund Skovby, Valby (DK); Asmus Ringlebjerg Mortensen, Valby (DK); Jens Andersen Gad, Valby (DK)

(73) Assignee: H. Lundbeck A/S, Valby (DK)

( * ) Notice: Subject to any disclaimer, the term of this patent is extended or adjusted under 35 U.S.C. 154(b) by 556 days.

(21) Appl. No.: 16/500,973

(22) PCT Filed: Apr. 5, 2018

(86) PCT No.: PCT/EP2018/058673
§ 371 (c)(1),
(2) Date: Oct. 4, 2019

(87) PCT Pub. No.: WO2018/185199
PCT Pub. Date: Oct. 11, 2018

(65) Prior Publication Data
US 2021/0302282 A1 Sep. 30, 2021

(30) Foreign Application Priority Data
Apr. 5, 2018 (DK) .............................. PA201700244

(51) Int. Cl.
*B01D 46/10* (2006.01)
*B01D 46/18* (2006.01)
(Continued)

(52) U.S. Cl.
CPC ........... *G01N 1/4077* (2013.01); *B01D 46/10* (2013.01); *B01D 46/18* (2013.01); *G01N 1/2205* (2013.01);
(Continued)

(58) Field of Classification Search
CPC .... B01D 46/10; B01D 46/4281; B01D 50/00; B01D 29/03; B01D 29/6438;
(Continued)

(56) References Cited

U.S. PATENT DOCUMENTS 3,293,227 A   12/1966  Boggess et al.
3,594,991 A *   7/1971  Berz ...................... B01D 50/00
                                    55/432
(Continued)

FOREIGN PATENT DOCUMENTS

CN     1479643 A    3/2001
CN     2714125 Y    8/2005
(Continued)

OTHER PUBLICATIONS

PCT/EP2018/058673, Sep. 6, 2018, International Search Report and Written Opinion.
(Continued)

*Primary Examiner* — Minh Chau T Pham
(74) *Attorney, Agent, or Firm* — Wolf, Greenfield & Sacks, P.C.

(57) ABSTRACT

An apparatus and a method for isolating and/or preparing particles are provided.

19 Claims, 9 Drawing Sheets

(51) Int. Cl.
*B01D 29/03* (2006.01)
*B01D 29/64* (2006.01)
*G01N 1/22* (2006.01)
*G01N 1/40* (2006.01)
*G01N 15/02* (2006.01)

(52) U.S. Cl.
CPC ........ *G01N 1/2211* (2013.01); *G01N 15/0272* (2013.01); *G01N 2001/4088* (2013.01); *G01N 2015/0288* (2013.01)

(58) Field of Classification Search
CPC .............. G01N 1/2205; G01N 1/2211; G01N 2001/4088; G01N 2015/0288
USPC ...................... 55/302, 432; 95/280
See application file for complete search history.

(56) References Cited

U.S. PATENT DOCUMENTS

| | | | | |
|---|---|---|---|---|
| 6,551,368 | B1* | 4/2003 | Kordas | B01D 46/4281 95/280 |
| 2008/0067137 | A1 | 3/2008 | Banister et al. | |
| 2009/0191349 | A1 | 7/2009 | Norimatsu | |
| 2010/0096341 | A1 | 4/2010 | Benesi | |
| 2012/0138093 | A1* | 6/2012 | Sappok | B01D 46/71 55/303 |
| 2017/0296946 | A1* | 10/2017 | Vette | B01D 25/164 |
| 2019/0046998 | A1* | 2/2019 | Stephens | B01D 11/0269 |

FOREIGN PATENT DOCUMENTS

| | | |
|---|---|---|
| CN | 101406772 A | 4/2009 |
| CN | 101991981 A | 3/2011 |
| CN | 202052392 U | 11/2011 |
| DE | 1519958 A1 | 2/1969 |
| DE | 3221148 A1 | 2/1983 |
| DE | 3901851 A1 | 7/1990 |
| EP | 0781160 A1 | 7/1997 |
| EP | 1 683 561 A1 | 7/2006 |
| EP | 3122706 A1 | 2/2017 |
| GB | 1 352 765 A | 5/1974 |
| JP | S56-042313 U1 | 4/1981 |
| JP | 2009-179843 A | 8/2009 |
| WO | WO 2012/010430 A1 | 1/2012 |
| WO | WO 2015/033117 A1 | 3/2015 |

OTHER PUBLICATIONS

International Search Report and Written Opinion dated Sep. 6, 2018 in connection with International Application No. PCT/EP2018/058673.

Perlmutter et al., Solid-liquid separation technology for removing contaminant fines from water scrubbing, clarifier effluents and grey water paper No. 480801 introduction. BHS Sonthofen. Jan. 31, 2017;1-10.

* cited by examiner

APPARATUS AND METHOD FOR ISOLATION AND/OR PREPARATION OF PARTICLES

CROSS REFERENCE TO RELATED APPLICATIONS

This Application is a National Stage filing under 35 U.S.C. 371 of International Patent Application No. PCT/EP2018/058673, filed Apr. 5, 2018, which claims foreign priority benefits are claimed under 35 U.S.C. § 119(a)-(d) or 35 U.S.C. § 365(b) of Denmark Application Number PA201700244, filed Apr. 7, 2017. The entire contents of these applications are incorporated herein by reference in their entirety.

The present invention relates to an apparatus and a method where isolation and/or preparation of particles takes place in a single chamber or in a number of parallel single chambers e.g. in two consecutive steps. Due to the internal movement of material in the chamber, comminution of the material may take place during the isolation and/or preparation. The apparatus may be used for the filtration of any particular matter, i.e. solid inorganic or organic compounds, from any liquid, e.g. water or organic solvents or mixtures, followed by drying and comminution of obtained material or particles in the same chamber. The apparatus is valuable for the chemical, pharmaceutical or biotechnical industries, where such particles are frequently handled and where contained and integrated filtration, drying and comminution processes are particularly welcome. The apparatus may be adapted to automatization.

TECHNICAL FIELD

A wide range of isolation and filtration apparatus already exists. A filtration apparatus typically used in the fine chemical and pharmaceutical industry often works in batch mode and requires a very large filter surface area to provide for a required removal of liquid from a suspension of solids within acceptable cycle-times. Generally, it is therefore desirable to either provide a continuous process to replace the known batch processes or alternatively to reduce the retention time for each batch process or to combine a series of batch processes such as filtration, drying and comminution.

WO 2015/033117 discloses a filtration apparatus provided with a rotatable carousel including five equi-spaced cylindrical chambers. Beneath the chambers a kidney shaped filter plate is provided and also a downwardly extending opening. The chambers are selectively movable to be located over the filter or over the opening in which latter position material can be ejected from the respective chamber by a piston and cylinder located above the opening.

The device disclosed in WO 2015/033117 approaches a continuous process but the device comprises several moving parts which increases the demand for maintenance and the risk for operation failure.

Technologies widely used in the industry for particle isolation from liquids include open or closed nutsche filters, filter presses and centrifuges. A number of drying technologies exist to evaporate the remaining liquid from the wet filter cake thus obtained. These include tray dryer, double cone dryer and paddle dryer. More recently technologies combining filtration and drying unit operations such as filter-dryer and centrifuge-dryer have become widely used in the industry. Often de-agglomeration is required or a particular particle size of the product is desired and to achieve this various milling and micronisation technologies have been developed.

All of the existing filtration, drying and milling technologies have several drawbacks. The machinery is generally large, costly and requires much space. With the sizable dimensions comes unfavourable mass-to-filter-area ratio and unfavourable heat-transfer affording lengthy process times for both filtration and drying and inefficient energy usage as the process equipment need to be heated and afterwards cooled.

Due to the discrete unit operations, laborious material handling is required upon finalization of each unit operation, i.e. wet filter cake needs to be discharged from the filtration operation and charged to the dryer and then again discharged from the dryer only to be charged to the comminution operation. Most technologies have moving parts inside the filtration, drying or milling chamber for agitation or material manipulation adding to technical complexity, which subsequently leads to high construction, maintenance and cleaning cost.

Moreover, if micronisation is required usually a delumping through a mill or grinding machine is required first adding yet another unit operation, material handling and technological complexity to the entire process.

Further, each manual handling step and exposure to surrounding atmosphere introduces a risk of material contamination, and when handling the material manually there is a risk of persons being contaminated.

Although continuously operated versions of some of the technologies exist, e.g. belt-filter, continuous centrifugation and milling, usually the unit operations are handled in batch mode in the fine chemicals and pharmaceutical industry. The main reason for this is that an operation is often done under reduced pressure in order to limit the temperature to protect the often temperature labile compounds and therefore technically challenging to be feeding and emptying continuously.

Advantages of Current Invention

The present invention discloses a method for a faster and more efficient process entailing e.g. filtration of particles from a liquid, washing of filter cake if required, drying of particles if required, comminution of the particles to the extent required and emptying of dry milled particles. All stages of the process are performed in a simple easy to clean chamber. Gas inlet nozzles into the chamber may facilitate energy and material transfer necessary for conducting the involved unit operations. Application of gas through the nozzles modifying direction and gas velocity (flow) facilitates processes such as pressure induced filtration, agitation of filter cake during wash with an appropriate liquid, accelerated drying of particles, comminution of particles, transport of particles out of the chamber and in addition assisted cleaning of the chamber using an appropriate liquid.

Elevated gas temperature and/or operation in vacuo can e.g. accelerate the drying time. Evaporation of liquid using heated gas stream is highly efficient compared to the traditional drying equipment where much of the energy applied is stored by the heat capacity of the process equipment until additional energy is used to cool down the equipment again.

No moving parts are necessary which simplifies the construction, maintenance and cleaning of the apparatus. The simplicity also makes scaling of the apparatus easy.

Large dimensions to support typical batch operation and miniature construction offering the advantage of microbatch operation scaled to fit either tiny batch sizes or a continuous flow product stream.

The invention describes a closed system capable of handling several consecutive unit operations reducing manual material handling to a minimum, which is preferable from safety, environmental, good manufacturing practice and process economical perspectives.

SUMMARY OF INVENTION

According to a first aspect, the present invention relates to a method for isolating and/or preparing material. The method comprises the following steps:

a) Providing a feed material comprising particles to be isolated and/or prepared e.g. in form of slurry or particular material in a chamber provided with a filter having a filter surface, optionally introducing liquid such as washing or suspension liquid before, during or after the feed material is placed in the chamber;

b) If the material in the chamber from step a) contains liquid, the feed material is filtered by draining out said liquid through an outlet for filtrate leaving retentate on the filter surface, c) Directing one or more gas jets towards the feed material from step a) or the retentate from step b) loosening the material from the retentate side of the filter surface;

d) Removing the loosened material through an outlet for loosened material.

According to any embodiment of the invention, in step c) at least one gas jet may contribute to creating a vortex of gas and particles inside the chamber.

According to any embodiment of the invention, in step c) at least one gas jets is not contributing to creating a vortex inside the chamber i.e. this gas jet may be directed towards the filter surface in an angle pointing towards the filter surface or pointing towards the centre of the chamber in an angle approximately parallel to the filter surface. That a gas jet points towards the filter surface means that the gas jet provides a flow of gas in a direction where (x=0, y<0) or (x>0 and y<−2x), the coordinate system being defined below in paragraph "Definition of words". All gas jets enter the chamber from a position at or close to an inner surface of the chamber, normally an inner side surface i.e. a side surface is generally orthogonal or approximately orthogonal to the filter surface.

According to any embodiment of the invention, in step d) the loosened material may be suspended in the gas from a gas jet and carried from the filter surface to the outlet for loosened material by the gas of a gas jet.

According to any embodiment of the invention, in step d) the loosened material may either be removed continuously from the chamber or be removed after a period, thatch, when a suitable degree of drying or a suitable degree of granulometry either by deagglomeration or by micronisation has been obtained.

According to any embodiment of the invention, in step c) two or more gas jets may be directed against same point, e.g. centre of the chamber in same distance from filter surface, thereby accelerating collision of particles contained in the loosened material.

According to any embodiment of the invention, in step c) a gas jet may be directed towards the loosened material for a period of time, $t_jet$, or a gas jet may be continuously directed towards the loosened material.

According to any embodiment of the invention, gas may in one or more step only be removed through the filter, thereby keeping loosened material from escaping the retentate side of the chamber.

According to any embodiment of the invention, the feed material introduced in step a) may be introduced either as a batch or a succession of batches or as a continuous flow. E.g. a number of chambers may be combined and run sequentially to approach true continuous inlet and outlet from a system of chambers in parallel.

According to any embodiment of the invention, step a) may comprise a continuous feed material in the form of a slurry into the chamber, step b) may then comprise continuous draining of free liquid from the slurry, step c) may then comprise a simultaneous continuous gas flow through one or more gas jets integrated in said chamber to continuously dry and or comminute said particles and step d) may then comprise continuous evacuation of the loosened material when said loosened material in form of particles are qualified for evacuation.

According to any embodiment of the invention, the draining of liquid may be provided by gravity or enhanced gravity, increased pressure or vacuum.

According to any embodiment of the invention, in step a) washing or suspension liquid may be introduced before, during or after introduction of the feed material and at least one gas jet may provide agitation of the liquid suspension of material to be filtered.

Washing liquid may be introduced after filtration in step b) e.g. via a separate washing liquid inlet and a gas jet from a gas nozzle having an appropriate placement and direction may be used to agitate retained particles in order to accelerate cleaning.

According to any embodiment of the invention, in step c) the flow (F) of gas from at least one gas jet may be added in a direction tangential to a circle having a radius $r_1$ smaller than the smallest distance $r_{min}$ between the central axis C and an inner wall of the chamber (1) and larger than 0. The flow (F) of drying gas may be added tangentially to a circle having a radius $r_1$ between $0.3 \cdot r_{min}$ and $0.9 \cdot r_{min}$, or may be added tangentially to a circle having a radius between $0.4 \cdot r_{min}$ and $0.8 \cdot r_{min}$.

According to a second aspect the present invention relates to an apparatus which may be used for isolation and/or preparation of particles. The apparatus comprises a chamber which chamber comprises an inlet for feed material to be isolated and/or prepared e.g. filtered, dried and comminuted, in the form of a slurry or a particular material, optionally an inlet for liquid such as washing or suspension liquid, a filter having a filter surface on which surface a material is positioned at least during operation of the apparatus, an outlet for filtrate, an outlet for prepared material comprising an opening to a passage through a wall of the chamber, one or more gas inlets placed on the retentate side of the filter through which gas inlets gas jets are provided, wherein the one or more gas inlets are configured to direct a flow of gas in form of a gas jet towards the material on the filter surface thereby loosening the material from the filter surface. The material placed on the filter surface after filtration has a height $h_f$.

According to any embodiment of the second aspect of the invention, the at least one gas inlet may be configured to direct a flow of gas in form of a gas jet approximately parallel to the filter surface within the distance $h_j$ from the filter surface and to direct the flow of gas sufficiently off-centre of the chamber, where the centre is defined as a central axis of the chamber, to create a vortex inside the chamber when the material (8) has been suspended in the gas. The central axis is normally vertical.

According to any embodiment of the second aspect of the invention, the chamber (1) may have a round cross section i.e. the chamber may be formed like a cylinder or like a truncated cone, or the chamber may have an oval cross section or the cross section of the chamber may have no corners with an angle of 90° or below, e.g. no corners with an angle of 110° or below. In case the chamber is formed like a truncated cone or has a similar varying cross section, the chamber will normally be widest upward.

According to any embodiment of the second aspect of the invention, the inlet for gas may be configured to direct a gas jet tangentially to a circle having a radius $r_f$ smaller than the smallest distance $r_{min}$, between the central axis C and an inner wall of the chamber (1) and larger than 0.

For a chamber with a constant circular profile i.e. a cylinder, $r_{min}$=the constant radius, for a chamber with a declining or increasing circular profile i.e. a truncated cone, $r_{min}$=radius at the end of smallest diameter, for a chamber with an oval profile, $r_{min}$=the ½·distance between the two closest opposite walls of the chamber, etc. A skilled person will be able to establish a $r_{min}$ for a given profile shape.

According to any embodiment of the second aspect of the invention, the inlet for gas may be configured to direct a gas jet tangentially to a circle having a radius $r_1$ between $0.3 \cdot r_{min}$ and $0.9 \cdot r_{min}$, normally between $0.4 \cdot r_{min}$ and $0.8 \cdot r_{min}$.

According to any embodiment of the second aspect of the invention, the opening of the outlet for dried product can be moved axially thereby varying the distance between the opening of the outlet and the filter surface. The vertical adaption may take place during installation of the apparatus or before and/or during operation According to any embodiment of the second aspect of the invention, the opening of the outlet for dried product can be moved radially thereby varying the distance between the opening of the outlet and the central axis C of the chamber. The horizontal adaption may take place during installation of the apparatus or before and/or during operation.

According to any embodiment of the second aspect of the invention, the apparatus may comprise an inlet for liquid, e.g. washing liquid.

According to any embodiment of the second aspect of the invention, the chamber may comprise more than one tangential inlet for gas, such as 1-20 inlets, such as 2-8 inlets, such as 4-8 inlets for gas. Each inlet may correspond to a nozzle and the number of inlets will among other things depend on the diameter of the chamber. There is a relation between diameter of chamber and optimum number of inlets; a larger chamber will therefore normally require a larger number of inlets.

According to any embodiment of the second aspect of the invention, the apparatus may be further provided with an inlet for gas jet directed to the centre C of the chamber.

A gas jet directed to the centre line C of the chamber or another gas jet not contributing to creating a stable vortex may normally be activated in periods where the gas jet from the one or more tangential inlets are not active or alternatively in pulses either when the one or more tangential inlets is active or not active. E.g. such a gas jet may be activated during washing or at the beginning of a drying or loosening process.

According to any embodiment of the second aspect of the invention, the gas inlet(s) may be positioned at the end of the chamber closest to the filter surface, normally through the wall of the chamber at a height $h_j$ above the filter surface.

According to any embodiment of the second aspect of the invention, an outlet (7) for gas may be positioned at the center or off-center of the chamber with an opening above the filter surface. Normally, the outlet is placed at the top of the chamber i.e. through the top wall of the chamber. Also, gas may be removed through the filter exiting on the filtrate side of the filter during periods where liquid is not removed through the filter.

According to any embodiment of the second aspect of the invention, the apparatus comprises more than one chamber. The chambers may be connected in in parallel. A multiplicity of chambers may make it possible to approach a continuous process. In this case each chamber receive a batch of feed and deliver a batch of prepared material, the complete resulting amount of prepared material from a multiplicity of chamber will then appear as a continuous flow. However, it may also be possible to run a continuous process in an individual chamber, a single chamber then receives a continuous flow of feed material and deliver a continuous flow of isolated and/or prepared material; this however may not be possible or suitable if e.g. washing of a filtered material is needed.

According to a third aspect the present invention relates to use of an apparatus for controlling drying and/or granulometry of loosened material in a single chamber or in a combination of chambers.

According to a fourth aspect the present invention relates to use of an apparatus for controlling drying and/or granulometry of a loosened material in a chamber by providing at least one gas jets causing a vortex and then controlling the temperature of the gas jet, the retention time of the loosened retentate in the chamber (1), the velocity of the gas flow and the amount of inflowing gas in such a way that the drying and particle size distribution of the loosened retentate is controlled.

Definition of Words

"An" or "a" applied before a substantive are in the present specification synonymous with the expression "one or more".

The words "comminution" and "micronisation" are understood to include both de-agglomeration of agglomerated particles and down-sizing of particles.

"gas jet" defines gas ejected as a coherent stream into a surrounding medium and the gas jet normally has a well-defined direction and velocity. Normally, the gas jet is obtained by providing the gas flow through a nozzle.

"loosened material" or "loosened particular material" defines that the material has changed from an agglomerated or at least partly agglomerated form to an essentially particulate form, i.e. the material changes from a lumpy or solid form to a powder form.

"retentate" is the solid material remaining on a filter surface after filtration, whereas "filtrate" is the liquid passing through a filter during filtration.

A filter generally has a retentate side i.e. the side touched by the suspension to be filtered and a filtrate side i.e. the side from which the filtrate is removed. In the present specification filter surface corresponds to the retentate side of the filter i.e. the filter surface faces towards the inside of the chamber.

"vortex" in the context of the present application defines a mass of fluid, such as a liquid or particles suspended in gas, with a whirling or circular motion forming a cavity or vacuum in the center of the circle "slurry"—is a mixture of insoluble matter, e.g. in form of particles in a liquid "approximately parallel to the filter surface" means that the direction of a flow e.g. defined by the coordinates (x,y), is either parallel to the surface on which the material to be suspended rests i.e. (x, 0) and deviates with the angle=0 from a direction parallel to the resting surface or that the direction deviates with less than 45 degrees from a direction parallel to the resting surface i.e. (x, |y|<|x|), preferably less than 20 degrees from a direction parallel to the resting surface i.e. (x,|y|<|x·sin(20°)|) or deviates even less than 10 degrees from a direction parallel to the resting surface i.e. (x, |y|<|x·sin(10°)|).

According to the present specification a coordinate system is considered to have a x-axis parallel to the surface on which the material to be suspended will rest e.g. the filter surface, and an y-axis orthogonal to the x-axis. In the above system the origin O (0,0) is chosen to be at a gas inlet opening.

"Isolated and/or prepared" in the present context is intended to include the unit operation comminution, i.e. reduction of particle size. It may for instance mean the unit operations filtration, drying and comminution. Alternatively, it may for instance mean the unit operations filtration, drying, comminution and washing, such as a sequence consisting of filtration followed by washing followed by drying followed by comminution, or it may mean a sequence consisting of filtration followed by drying followed by comminution. It includes for instance the unit operations needed to bring a suspension of particles (slurry) to a collection of (optionally) washed particles with a desired dryness and a desired particle size distribution. The method and apparatus of the present invention can thus be used e.g. to prepare particles for further down-stream processes, such as granulation. In one embodiment, "Isolated and/or prepared" is intended to indicate the combination of the unit operations filtration, drying and comminution. In one embodiment, "Isolated and/or prepared" is intended to indicate the combination of the unit operations filtration, washing, drying and comminution.

BRIEF DESCRIPTION OF THE DRAWINGS

FIGS. 3 (c), (d), (e) and (f) show microscope pictures of vortioxetine HBr filtered, dried and comminuted according to the present invention (see Example 10). The scale is indicated in the upper left corner of each picture. (a) and (c), 500 µm; (b), (d), (e) and (f), 100 µm.

DETAILED DESCRIPTION OF THE INVENTION

In describing the embodiments of the invention specific terminology will be resorted to for the sake of clarity. However, the invention is not intended to be limited to the specific terms so selected, and it is understood that each specific term includes all technical equivalents which operate in a similar manner to accomplish a similar purpose.

Figure 1:
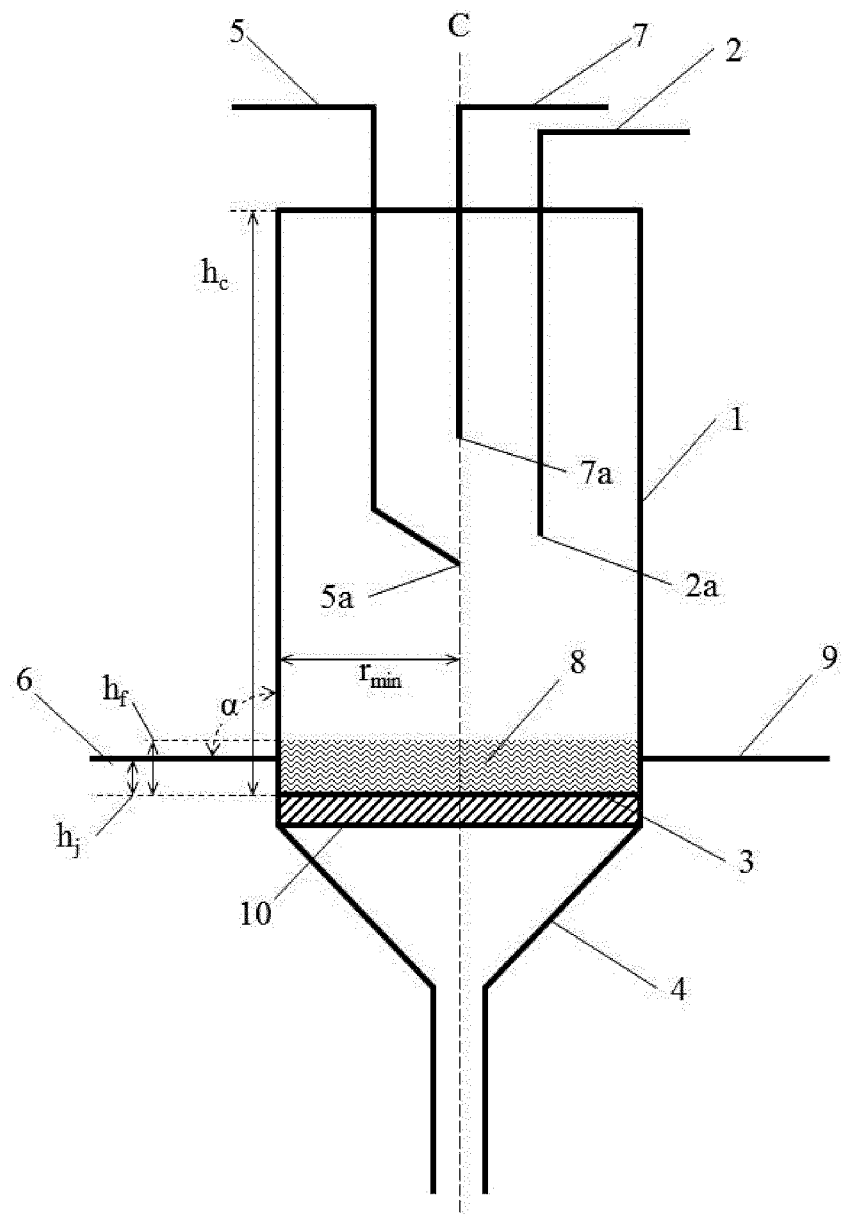
FIG. 1 shows a schematic vertical cross section view of an embodiment according to the invention relating to an apparatus directed to isolation and/or preparation, e.g. filtering, washing, drying and comminution of feed material.

FIG. 1 discloses a vertical cross sectional view of an embodiment of an apparatus according to the invention which embodiment may be used for filtration, drying and comminution of feed material. The apparatus comprises a filtration chamber 1 which chamber comprises an inlet 2 for feed material to be filtered having an inlet opening 2a through which opening the material to be filtered flows into the chamber. Normally the material to be filtered is in form of a slurry which slurry may be obtained from a previous crystallization process or precipitation process normally applied within e.g. the pharmaceutical industry. The opening 2a of the inlet is normally placed at the upper end e.g. at the upper half of the chamber 1, possibly at the top of the chamber 1, allowing transport of the feed material at least partly by gravity. However, the feed material may also be pumped into the chamber 1 and then the inlet can be positioned anywhere in the chamber 1. The material to be filtered can also be added to the chamber as a more or less dry particulate material where liquid e.g. in the form of washing liquid, is added to the particulate material inside the chamber 1.

The chamber 1 further comprises a filter material 10 situated at the lower end or at the bottom of the chamber 1. The filter material 10 has a filter surface 3 facing inwards in to the chamber 1 and the filter material 10 prevents larger particles of the material to be filtered from liquid escaping the chamber 1. The size of the particles allowed to escape through the filter material 10 depends on pore size and filter thickness of the filter material 10 and this is chosen according to the material to be filtered and the process which the apparatus participates in.

When a slurry to be filtered is positioned in the chamber 1, the liquid part i.e. the filtrate is removed through the filter material 10 and enters into an outlet 4 for filtrate. When removing the filtrate a mass of conglomerated particular material, i.e. a retentate 8, is left on the filter surface 3. The retentate 8 will normally form a paste as the particles are wet and therefore adhering to each other and the mass of particular material on the filter surface 3 has a height $h_f$.

The filtrate may be forced through the filter material 10 due to gravity, but often a gas flow increases the pressure above the filter material 10 and/or a vacuum pump decreases the pressure below the filter material 10 in order to increase the pressure difference over the filter and thereby increase the velocity of the filtering process.

The retentate 8 may be subjected to a washing process after filtration. Washing liquid may be added through the inlet 2 for material to be filtered or washing liquid may alternatively or additionally be added through a separate inlet if this is expedient. Such a separate inlet for washing liquid may be placed anywhere in the chamber 1 but will normally be placed such as to have an outlet opening above the height $h_f$ of the retentate 8. After supplying the washing liquid to the retentate 8 in the chamber 1, the mixture can be subjected to agitation in order to completely suspend and wash the retentate. Agitation can be performed by supplying a gas flow or gas jet to the suspension through a gas inlet for drying gas, through a gas inlet dedicated to agitation, or simply by pumping in the washing liquid at high speed thereby suspending and agitating the retentate 8.

When the filtrate has been drained from the retentate 8, gas is supplied to the chamber. The gas may be applied through one or more gas inlets 6 and 9, as illustrated in the embodiments of the figures, the gas inlets 6 provides a tangential flow F of gas and the gas inlet 9 provides a flow directed to the centre C of the chamber 1. All gas applied in the apparatus may be inert both in connection with the liquid or solvent carrying the particular material and with the particular material. If neither the liquid nor the particular material react with oxygen then air can be used as inert gas, however, nitrogen gas is often used as it generally is considered inert.

The retentate 8 may be subjected to a pre-drying and/or loosening operation where gas, optionally heated gas, is directed towards the retentate 8 from any direction—e.g. horizontally in a tangential or central direction or vertically—in order to remove part of the remaining liquid and possibly loosen the mass of particular material forming the retentate 8. Gas may be removed through filtrate outlet 4 in the pre-drying phase. Gas may also be removed through filtrate outlet 4 in drying or comminution phase. Especially when using a non-tangential nozzle i.e. a nozzle pointing in a horizontal central direction, as the mass of particles in such a situation does not form a vortex but will be distributed randomly across the chamber and particles having an undefined particle distribution may then escape through the outlet placed on retentate side.

After filtration and an optional pre-drying and loosening process, the retentate 8 positioned on the filter surface 3 is subjected to a tangential flow F of gas in form of a gas jet. The chamber 1 has one or more tangential inlets 6 for gas able to provide a gas jet and the flow may enter the chamber 1 through one or more nozzles. When the gas enters through a nozzle it is possible to give the gas flow a well-defined direction and velocity. Generally, the inlets 6 and the nozzles are placed in such a way that the gas jet entering the chamber has a velocity (m/s) and a direction (x, y) allowing the gas to create a stable vortex inside the chamber 1; x and y belongs to a coordinate system where the x-axis is positioned along a line representing the radius from the opening of a gas inlet 6 to a central axis C of the chamber and the y-axis is positioned along a line through the opening of the gas inlet 6 and orthogonal to the x-axis. In a cylindrical chamber having straight vertical walls and an inlet opening of the gas inlet at the surface of the wall, the y-axis would be vertical and parallel to the inner wall of the chamber 1, whereas the x-axis would be horizontal. A stable vortex means that the gas moves in an approximately stationary pattern. In order to create a stable vortex x is normally larger than or equal to y i.e. the gas flow from the tangential inlets 6 has a direction deviating less than 45° from the horizontal x-axis, Depending on the vertical position of the opening of the gas inlet 6, y may be <0 or >0 or =0, if y<0 the gas flow is directed "downwards" in direction of the filter surface 3, if y=0 the gas flow is parallel to the x-axis i.e. normally horizontal.

A desired height $h_f$ of retentate 8 on the filter surface is normally chosen in respect of the process according to which the filtration operation is performed. The vertical and horizontal position of the gas inlets 6 as well as the direction of the gas jet may be adapted to a specific process upon installation of the apparatus according to the invention.

If the opening of the gas inlet 6 during operation is positioned at a height lower than the height $h_f$ of retentate 8 on the filter surface, the direction of the gas jet at the opening of the gas inlet 6 may be approximately parallel to the filter surface 3, i.e. y=0 at a height h which is lower than the height $h_f$ of the retentate 8.

If the opening of the gas inlet 6 is positioned above the retentate 8 on the filter surface, the direction of the gas jet at the opening of the gas inlet 6 may be downward towards the filter surface 3, i.e. y<0. Optionally, the gas jet may be directed across or onto the filter surface 3 in order to obtain cleaning of filter surface 3 at the same time as drying and de-agglomeration.

Also, a tangential flow of gas, i.e. a tangential gas jet, must have a direction tangential to a circle having a radius $r_f$, $r_f$ being smaller than the smallest distance $r_{min}$ between the central axis C and an inner wall of the chamber 1 and larger than 0. Normally the flow (F) of drying gas has a direction tangential to a circle having a radius $r_1$ larger than $0.3 \cdot r_{min}$, e.g. between $0.3 \cdot r_{min}$ and $0.95 \cdot r_{min}$, alternatively between $0.4 \cdot r_{min}$ and $0.9 \cdot r_{min}$, alternatively $r_f$ is larger than $0.5 \cdot r_{min}$, alternatively between $0.5 \cdot r_{min}$ and $0.9 \cdot r_{min}$, alternatively between $0.6 \cdot r_{min}$ and $0.8 \cdot r_{min}$. The setting of the direction of the gas flow may be guided so as to avoid blind spots on the filter surface, i.e. areas on the filter surface where material may build up due to the velocity of the gas flow being zero or close to zero in or around said area. Computational Fluid Dynamics simulations indicate that the $r_1$ specified above achieves this purpose.

Generally, the inlet(s) 6 extends through the wall of the chamber 1 in the half-part of the chamber where the retentate 8 is positioned i.e. the inlet(s) 6 has/have an opening at a height h which is lower than the height $h_f$ of the retentate 8 in the direction defined above. Optionally, the gas inlet(s) 6 is/are positioned at a height h which is less than 2×the height $h_f$ and the height $h_f$ is less than 0.5×the inside height of the chamber $h_c$.

Due to the tangential flow F of gas i.e. the tangential gas jet, a vortex of gas carrying free flowing particular material extending towards the height $h_c$ of the chamber will be created inside the chamber 1 as the retentate 8 loosens and dries. The suspended particles are separated from the flowing gas due to gravity and due to the inertia of the particles created by the vortex and a gas practically free from suspended particles may then be evacuated through a central outlet 7. When the vortex is created in the chamber 1, drying and micronisation through attrition of the suspended particular material takes place. By varying the retention time in the chamber it is possible to control the degree of drying and the degree of micronisation.

Generally, the internal height $h_c$ of the chamber 1 is higher than the inner diameter $r_{min}$, e.g. $h_c$ is at least $4 \cdot r_{min}$, i.e. 2 times the minimum inner diameter, possibly at least $5 \cdot r_{min}$. These dimensions will allow formation of a vortex able to treat and separate particular material carried by the gas.

When a vortex is created and the desired moisture level and micronisation of the suspended particles have been reached, the obtained dried product in form of particular material can be collected through an outlet 5 for dried product having an opening 5*a* which opening 5*a* is positioned above the originally formed wet mass of retentate 8.

The outlet 5 for dried product may be constructed as a tube or conduit extending vertically inside the chamber 1, particularly the outlet 5 might enter through the top wall of the chamber or a part of the outlet 5 can move in the vertical direction thereby positioning the opening 5*a* of the outlet 5 in a desired height to optimize removal of dries and comminuted material either upon installation of the apparatus or before or during operation. Optionally, the outlet 5 may simply be an opening 5*a* in the wall of the chamber 1 positioned near the top of the chamber 1 or at least in the upper half of the chamber 1.

Depending on the product, the opening 5*a* for dried product may be positioned both vertically and horizontally in such a way that removal of the dried and/or loosened particular material is optimized. The end of an at least partly vertical tube providing the outlet 5 for dried product may comprise a bend part near the end of the tube where the opening 5a is positioned. The angle between the vertical tubing and the bend part is normally between 20 and 90 degrees. If the opening 5a is positioned at the end of the tube, such a bend part means that the opening can be positioned at different horizontal positions if the tube is rotated. As it is not necessary to move the vertical part of the tube relative to the wall of the chamber in order to displace the opening 5a horizontally, this solution makes it easier to provide an effective sealing of the chamber.

If the tube or conduit of the outlet 5 is provided with an bend part at the end of the opening 5a, then the horizontal position of the opening 5a for dried product may be adjusted—either upon installation of the apparatus or before or during operation of the apparatus—by rotating the outlet 5. By varying the horizontal distance between the opening 5a and the centre C of the chamber 1 it is possible to optimize the position of the opening 5a in order to collect the suspended particles having desired size distribution. Generally, the purpose of optimal position is to qualify collection of particles, i.e. only particles smaller/lighter than a certain value may escape due to height/radius position of the outlet opening. Alternatively, more than one outlet (5) with varying horizontal and vertical positioning may be used to obtain particles with a desired degree of dryness and desired particle size distribution.

The dried product is transported inside the chamber 1 by the gas flow and can e.g. be removed from the chamber 1 by increasing the gas flow and it is therefore not necessary to have any moving parts inside the chamber 1 relating to transport and removal of product. Some gas will always escape through the outlet 5 for dried product but the outlet 5 may also function as primary outlet for gas, in this case the apparatus may not be provided with a separate outlet 7 for gas and the complete separation process must take place after the particulate material suspended in gas has left the chamber. However, if the apparatus is provided with a separate outlet for gas 7 a separation process takes place inside the chamber 1, the dried product may be collected by opening a valve connected to the outlet for dried product 5 and closing a valve connected to the outlet 7 for gas, directing the suspended particles through the opening 5*a* which is normally situated close to the chamber wall.

After the suspended mixture of gas and particles has left the chamber 1, the mixture is separated by known methods, e.g. in a cyclone or a bag filter.

FIG. 2A shows a cross-sectional view of a cylindrical chamber 1 having a round profile. The chamber 1 is provided with inlets and outlets identical to the ones shown in FIG. 1. The inlet 2 for feed material has form of a conduit and is therefore shown in FIG. 2A as a circle, when the inlet 2 is placed as shown in FIGS. 1 and 2A, feed material can flow from the opening 2*a* of the inlet and down on the filter surface 3 by gravity. The apparatus of FIG. 2A is provided with a single inlet 6 configured to direct a flow of gas F in form of a tangential gas jet towards the retentate 8 which during operation will be positioned on the filter surface 3. The inlet 6 directs a gas jet tangentially to a circle having a radius $r_1$ and in this embodiment $r_1$ is approximately $0.65 \cdot r_{min}$ and $r_{min}$, is identical to the radius of the cylindrical chamber 1. Further, the chamber is provided with a single inlet 9 for gas jet directed to the centre C of the chamber 1, this inlet is placed opposite the tangential inlet 6.

The opening of the outlet 5 is positioned approximately at the distance $r_f$ from the centre line C, but this position might be adapted according to the composition of the slurry and the suspension liquid entering the apparatus, and the desired dryness and particle size distribution of the isolated and/or prepared material.

FIG. 2B also shows a cross-sectional view of a cylindrical chamber 1 having a round profile and the chamber 1 is like the embodiment of FIG. 2A provided with inlets and outlets identical to the ones shown in FIG. 1. The apparatus of FIG. 2B is provided with four inlets 6 configured to direct tangential gas jets towards the retentate 8. The four inlets 6 directs a gas jet tangentially to a circle having a radius $r_1$ which is approximately $0.65 \cdot r_{min}$ and $r_{min}$, is identical to the radius of the cylindrical chamber 1. Further, the chamber is provided with four inlets 9 for gas jets directed to the centre C of the chamber 1, these four inlets are placed adjacent to each of the tangential inlets 6.

FIG. 2C shows a cross-sectional view of a chamber 1 having an oval profile with two symmetry axes and the chamber 1 is like the embodiments of FIGS. 2A and 2B provided with inlets and outlets identical to the ones shown in FIG. 1. The apparatus of FIG. 2C is provided with one inlet 6 configured to direct tangential gas jets towards the retentate 8. The inlet 6 directs a gas jet tangentially to a circle having a radius $r_1$ which is approximately $0.83 \cdot r_{min}$ and $r_{min}$, is identical to the smallest distance between the inner wall of the chamber 1 and the centre line C. Further, the chamber is provided with a single inlet 9 for gas jet directed to the centre C of the chamber 1, this inlet is placed opposite the tangential inlet 6.

EXPERIMENTS

The following experiments have been conducted in an apparatus having a single cylindrical chamber with inner radius ($r_{min}$) of 50 mm and an inner height ($h_c$) of 308 mm. The opening (5*a*) of the outlet (5) was placed 308 mm above the filter surface (3) 5 mm from the inner wall of the chamber. The opening of outlet (7*a*) was placed 263 mm above the filter surface 3, at the central axis (C) of the chamber 50 mm from the inner wall of the chamber. The opening (2*a*) of the inlet (2) was placed 308 mm above the filter surface (3) 5 mm from the inner wall of the chamber, opposite from the outlet (5). An additional inlet was placed 308 mm from the filter surface (3), at the central axis C of the chamber 5 mm from the inner wall of the chamber.

The apparatus was provided with four inlets for drying gas placed 2 mm (2 mm from filter surface to center of nozzle) above the filter surface and the four nozzles directed a flow tangential to a circle having radius $0.75 \cdot r_{min}$ at a direction parallel to the filter surface (3). The apparatus was also provided with four inlets for drying gas placed in the height 2 mm above the filter surface having nozzles directing a flow to the centre axis C and parallel to the filter surface (3).

Example 1 Drying and Comminution of Vortioxetine HBr 20 g of dry un-milled 1-(2-((2,4-dimethylphenyl)thio)phenyl)piperazine hydrobromide (vortioxetine HBr) crystals was added through an opening at the cylinder top, followed by 100 ml of toluene. A light flow of nitrogen gas was then applied through the four inlets for drying gas (6) and released through the outlet for wet gas (7), in order to suspend the particles in the added toluene. The mother liquor was then drained through the outlet for filtrate (4) by adding a flow of approximately 42 $Nm^3/h$ nitrogen at 120° C.

through the gas inlet (2) and closing the outlet for wet gas (7), thus creating a pressure difference over the filter surface (3). The supply of nitrogen was continued for 1 minute until no droplets could be detected in the chamber (1). The filter cake (8) was then lifted off of the filter surface (3) by adding a flow of approximately 42 Nm$^3$/h nitrogen at 120° C. through the four inlets for drying gas (6) and releasing the gas through the out let for wet gas (7). The particles were kept suspended in a vortex by nitrogen for 1 minute until the desired level of attrition and dryness was achieved, after which, the outlet for dried product (5) was opened and the outlet for wet gas (7) was closed, effectively evacuating the particles from the chamber (1). The particles were separated from the nitrogen in a cyclone connected to the outlet for dried product (5) and sampled for dry-matter analysis and particle size analysis.

The toluene content was determined by weighing out 10 g of collected particles, drying overnight under vacuum at 60° C. and measuring the difference in weight. The particle size distribution of the collected sample was measured by laser diffraction.

Table 1 discloses the result of the experiment and table 2 discloses the particle size distribution of the feed material and the comminuted material sampled from the experiment.

The dried product contains 0.7% w/w residual toluene illustrating the effective drying of material in the apparatus. The comminution achieved is evident from the particle size distribution of the product compared to that of the feed material, i.e. a factor of 20, 15 and 5 for X10, X50 and X90 respectively.

TABLE 1

Toluene content and particle size distribution of the feed material and comminuted material sampled from the experiment

| Sample | toluene (g/g) | particle size distribution | | |
| --- | --- | --- | --- | --- |
| | | $X_{10}$ (µm) | $X_{50}$ (µm) | $X_{90}$ (µm) |
| Feed material | 0.0% | 60 | 309 | 445 |
| Comminuted material | 0.7% | 3 | 21 | 91 |

TABLE 2

Particle size distribution (Volume mean diameter)

| | Density distribution (log.) | |
| --- | --- | --- |
| xm/µm | Feed material | Comminuted material |
| 1.5 | 0.01 | 0.16 |
| 4.97 | 0.03 | 0.38 |
| 5.98 | 0.03 | 0.42 |
| 6.98 | 0.04 | 0.45 |
| 8.22 | 0.04 | 0.49 |
| 9.95 | 0.05 | 0.53 |
| 11.96 | 0.05 | 0.58 |
| 14.2 | 0.06 | 0.61 |
| 16.93 | 0.07 | 0.65 |
| 19.94 | 0.07 | 0.67 |
| 23.18 | 0.08 | 0.69 |
| 27.39 | 0.09 | 0.69 |
| 33.54 | 0.11 | 0.67 |
| 41.08 | 0.14 | 0.63 |
| 48.61 | 0.16 | 0.6 |
| 57.28 | 0.18 | 0.57 |
| 68.47 | 0.2 | 0.56 |
| 82.16 | 0.24 | 0.53 |
| 97.21 | 0.27 | 0.49 |
| 114.56 | 0.3 | 0.42 |
| 136.93 | 0.33 | 0.3 |
| 164.32 | 0.41 | 0.18 |
| 196.72 | 0.6 | 0 |
| 234.15 | 1.01 | 0 |
| 278.88 | 1.69 | 0 |
| 333.65 | 2.41 | 0 |
| 398.47 | 2.73 | 0 |
| 473.31 | 1.57 | 0 |
| 562.78 | 0 | 0 |
| 672.33 | 0 | 0 |
| 801.95 | 0 | 0 |

Example 2 Drying and Comminution of Starch

An experiment was carried out essentially as described in Example 1, however using 20 g starch suspended in 50 ml ethanol. In comparison to the conditions of example 1, nitrogen at 70° C. at a flowrate of 12 Nm$^3$/h was applied to suspend the starch in a vortex, and the vortex was sustained for 90 seconds before the chamber was emptied.

Dry-matter content was determined by weighing samples before and after placing them at 60° C. overnight.

The starch used in this experiment was found to contain approximately 90% dry-matter which was increased to approximately 93% after the experiment.

Table 2 discloses the particle sizes (volume mean diameter as determined by laser diffraction) of treated and untreated starch.

TABLE 3

Particle size distribution of feed material and comminuted starch

| | Particle size distribution | | |
| --- | --- | --- | --- |
| Sample | $X_{10}$ (µm) | $X_{50}$ (µm) | $X_{90}$ (µm) |
| Feed material | 9 | 38 | 77 |
| Comminuted material | 3 | 32 | 57 |

The data shows that that effective drying and comminution of starch can be achieved using the apparatus.

Example 3 Drying and Comminution of Vortioxetine HBr

A set of experiments were carried essentially as described in Example 1 drying and comminuting vortioxetine HBr from a suspension in ethanol (20 g in 50 ml). Nitrogen gas at 70° C. was used to suspend vortioxetine in a vortex which was sustained for 90 seconds before the chamber was emptied. The table below discloses variations in the experimental setup.

| Run No | Experimental conditions |
| --- | --- |
| 1 | All four tangential gas inlets (6) open. 29 Nm$^3$/h nitrogen flow |
| 2 | All four tangential gas inlets (6) open. 29 Nm$^3$/h nitrogen flow |
| 3 | All four tangential gas inlets (6) open. 29 Nm$^3$/h nitrogen flow |

-continued

| Run No | Experimental conditions |
|---|---|
| 4 | All four tangential gas inlets (6) open. 29 Nm$^3$/h nitrogen flow |
| 5 | Two tangential gas inlets (6) open. 29 Nm$^3$/h nitrogen flow |
| 6 | All four tangential gas inlets (6) open. 18.5 Nm$^3$/h nitrogen flow |

Table 3 discloses obtained dryness and particle size reduction in the experiment. Particle size distribution was determined as volume mean diameter by laser diffraction, and % dry-matter from weighing a sample before and after placing it at 60° C. overnight.

TABLE 4

Dry-matter and particle size distribution of feed material and comminuted vortioxetine HBr

| Sample | % dry-matter | Particle size distribution | | |
|---|---|---|---|---|
| | | $X_{10}$ (µm) | $X_{50}$ (µm) | $X_{90}$ (µm) |
| Feed material | | 49 | 291 | 478 |
| 1 | 99.69 | 4 | 41 | 167 |
| 2 | 99.90 | 4 | 31 | 135 |
| 3 | 99.95 | 4 | 34 | 158 |
| 4 | 99.95 | 4 | 31 | 145 |
| 5 | 99.97 | 4 | 39 | 175 |
| 6 | 100.00 | 4 | 28 | 129 |

The data illustrates that the apparatus using a variety of experimental settings (gas flow velocity and number of active gas inlets) provides dry vortioxetine HBr with a marked reduction of the particle size.

Example 4 Drying and Comminution of Sugar

A set of experiments were conducted to investigated the influence of the time the material was suspended in the vortex (vortex time) and the positioning of the vortex in the chamber. The experiments were conducted essentially as described in example 1, however using 10 g of sugar (table sugar) in 50 ml ethanol. In comparison to example 1, nitrogen at 20° C. and a flow rate of 25 Nm$^3$/h was used to suspend the sugar in a vortex.

If only the tangential gas inlets (6) are open while the sugar is suspended in the vortex, the vortex is positioned towards the top of the chamber. If the orthogonal gas inlets (9) are also open, the vortex spreads out and occupies essentially the full length of the chamber. The table below discloses the experimental settings.

| | Vortex time (s) | | Vortex position | |
|---|---|---|---|---|
| Run | 90 | 180 | Top of the chamber | Full length of the chamber |
| 1 | | √ | | √ |
| 2 | √ | | | √ |
| 3 | | √ | √ | |
| 4 | √ | | √ | |

Table 4 discloses obtained and particle size reduction in the experiment. Particle size distribution was determined as volume mean diameter by laser diffraction

TABLE 5

Particle size distribution of feed material and comminuted sugar

| Sample | Particle size distribution | | |
|---|---|---|---|
| | $X_{10}$ (µm) | $X_{50}$ (µm) | $X_{90}$ (µm) |
| Feed material | 255 | 563 | 989 |
| Run 1 | 57 | 316 | 601 |
| Run 2 | 84 | 442 | 777 |
| Run 3 | 61 | 327 | 624 |
| Run 4 | 23 | 184 | 558 |

The data illustrates that the apparatus using a variety of experimental settings (vortex time and positioning) provides sugar with a marked reduction of the particle size.

Example 5. Drying and Comminution of Vortioxetine HBr

A set of five experiments were carried out essentially as described in Example 1, filtering, drying and comminuting vortioxetine HBr suspended in toluene (20 g in 50 ml). To filter toluene from vortioxetine HBr, nitrogen at a 6 Nm$^3$/h flowrate and 20° C. was used to create a 2 bar pressure difference over the filter. The same gas flow was then used to dry the filter cake for 30 seconds. Nitrogen gas at a 47 Nm$^3$/h flowrate at approximately 70° C. was used to suspend vortioxetine HBr in a vortex which was sustained for 60 seconds before the chamber was emptied.

Dry-matter content was determined by weighing samples before and after placing them in an oven at 60° C. overnight. The particle size distribution (volume mean diameter) of the feed material and comminuted vortioxetine HBr was determined by laser diffraction. The dry-matter content and particle size distribution is shown in Table 6.

TABLE 6

Particle size distribution of feed material and comminuted vortioxetine HBr and % dry-matter of the comminuted vortioxetine.

| Sample | % dry-matter | Particle size distribution | | |
|---|---|---|---|---|
| | | $X_{10}$ (µm) | $X_{50}$ (µm) | $X_{90}$ (µm) |
| Feed material | | 90 | 358 | 508 |
| 1 | 99.93 | 3 | 26 | 148 |
| 2 | 99.95 | 3 | 21 | 141 |
| 3 | 99.97 | 4 | 41 | 225 |
| 4 | 99.97 | 4 | 41 | 253 |
| 5 | 99.89 | 3 | 30 | 182 |

The data shows that effective drying and comminution is achieved.

Example 6. Drying and Comminution of Vortioxetine HBr

The experiments were carried out essentially as described in Example 1 with difference in the experimental setup as outlined below. A set of five experiments were conducted to investigate the effect of the number and positioning of the tangential gas jets used when drying and comminuting 20 g vortioxetine HBr suspended in 50 mL toluene. To filter toluene from vortioxetine HBr, nitrogen at a 6 Nm$^3$/h flowrate and 20° C. was used to create a 2 bar pressure difference over the filter. The same gas flow was then used to dry the filter cake for 30 seconds. Nitrogen gas at a 47 Nm³/h flowrate at approximately 70° C. was used to suspend vortioxetine HBr in a vortex which was sustained for 60 seconds before the chamber was emptied.

Figure 2A:
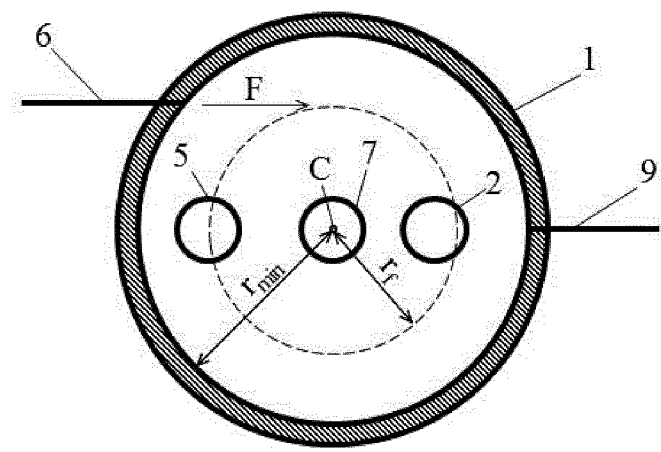
FIGS. 2A and 2B show horizontal cross section views of embodiments according to the invention having respectively one and four tangential inlets for drying gas and one or two centrally directed inlets for drying gas, respectively, and both having a circular profile.
Figure 2B:
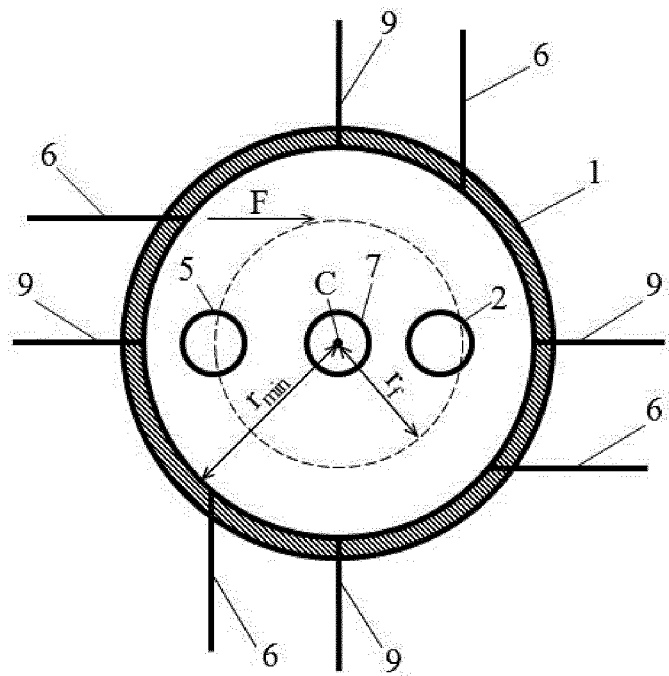
Figure 2C:
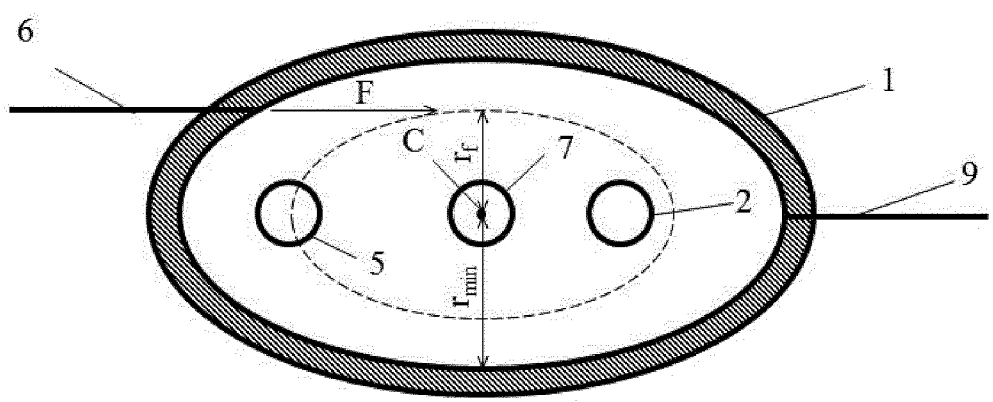
FIG. 2C shows a horizontal cross section view of an embodiment according to the invention having two tangential inlets for drying gas and an oval profile.

Table 7 shows which tangential gas jets were used in the five experiments. The numbering is with reference to FIG. 2(b) where 6(1) indicates the top tangential gas inlet, 6(2) indicates the next tangential gas inlet clock-wise and so on.

Dry-matter content was determined by weighing samples before and after placing them in an oven at 60° C. overnight. The particle size distribution (volume mean diameter) of both the feed material and comminuted vortioxetine HBr was determined by laser diffraction. The dry-matter content and the particle size distribution is shown in table 8

TABLE 7

An overview of which tangential gas jets were used at the different runs.

| Gas jets | 1 | 2 | 3 | 4 | 5 |
|---|---|---|---|---|---|
| 6(1) | x | X | X | x | x |
| 6(4) |   |   | X | x | x |
| 6(3) |   | X |   | x | x |
| 6(2) |   |   |   |   | x |

TABLE 8

Particle size distribution of feed material and comminuted vortioxetine HBr and % dry-matter of comminuted vortioxetine HBr.

|  |  | Particle size distribution | | |
|---|---|---|---|---|
| Sample | % dry-matter | $X_{10}$ (μm) | $X_{50}$ (μm) | $X_{90}$ (μm) |
| Raw material |  | 90 | 358 | 508 |
| 1 | 99.94 | 6 | 99 | 351 |
| 2 | 99.92 | 4 | 45 | 254 |
| 3 | 99.94 | 6 | 123 | 376 |
| 4 | 99.96 | 5 | 75 | 328 |
| 5 | 99.97 | 3 | 23 | 148 |

The data shows that efficient drying and comminution can be achieved with only one tangential gas jet. It also shows that the degree of comminution increases as the number of active tangential gas jets is increased.

Example 7. Drying and Comminution of Vortioxetine HBr

The experiment was carried out essentially as described for Example 1 with differences to the experimental setup as outlined below. A set of three experiments were carried out to investigate the effect of applying different flow patterns during drying and comminution. 20 g vortioxetine HBr suspended in 50 mL toluene was charged to the apparatus. To filter toluene from vortioxetine HBr, nitrogen at a 6 Nm³/h flowrate and 20° C. was used to create a 2 bar pressure difference over the filter. The same gas flow was then used to dry the filter cake for 30 seconds. Nitrogen gas at a 47 Nm³/h flowrate at approximately 70° C. was used to suspend vortioxetine for 60 seconds before the chamber was emptied.

The Flow Settings Used at the Three Different Runs:
1. All four tangential gas inlets were initially opened to suspend vortioxetine HBr in a vortex. Chaotic flow was created by closing the all four tangential gas jets briefly, which allowed the particles to settle and be fluidized again. These pulses were made six times during the 60 seconds drying period (every 10 seconds).
2. All four tangential gas inlets were initially opened to suspend vortioxetine in a vortex. Chaotic flow was created by opening the four gas jets directed towards the center axis briefly. These pulses were made six times during the 60 seconds drying period (every 10 seconds).
3. All eight gas jets were open throughout the 60 seconds drying period.

Dry-matter content was determined by weighing samples before and after placing them in an oven at 60° C. overnight. The particle size distribution (volume mean diameter) of both raw material and comminuted vortioxetine was determined by laser diffraction. The dry-matter content and the particle size distribution is shown in Table 9

TABLE 9

Particle size distribution of feed material and comminuted vortioxetine and % dry-matter of comminuted vortioxetine HBr.

|  |  | Particle size distribution | | |
|---|---|---|---|---|
| Sample | % dry-matter | $X_{10}$ (μm) | $X_{50}$ (μm) | $X_{90}$ (μm) |
| Feed material |  | 90 | 358 | 508 |
| 1 | 99.93 | 3 | 33 | 221 |
| 2 | 99.93 | 3 | 27 | 181 |
| 3 | 99.95 | 3 | 28 | 204 |

The data shows that it is possible to achieved applying different flow patterns during the drying and comminution period.

Example 8. Drying and Comminution of Vortioxetine

The experiment was carried out essentially as described for example 1 with differences in the experimental setup as outlined below. A set of four experiments were conducted to investigate the effect of the drying and comminution of 20 g vortioxetine HBr suspended in 50 mL toluene at different lengths of the drying and comminution period. At the first two runs the drying period was increased to 120 seconds and to 180 seconds at the third and fourth run.

To filter toluene from vortioxetine nitrogen at a 6 Nm³/h flowrate and 20° C. was used to create a 2 bar pressure difference over the filter. The same gas flow was then used to dry the filter cake for 30 seconds. Nitrogen gas at a 47 Nm³/h flowrate at approximately 70° C. was used to suspend vortioxetine HBr in a vortex which was sustained for 120 and 180 seconds, respectively before the chamber was emptied.

Dry-matter content was determined by weighing samples before and after placing them in an oven at 60° C. overnight. The particle size distribution (volume mean diameter) of both raw material and the comminuted vortioxetine HBr was determined by laser diffraction. The dry-matter content and the particle size distribution is shown in table 10

TABLE 10

Particle size distribution of feed material and comminuted vortioxetine and % dry-matter of comminuted vortioxetine.

| | | Particle size distribution | | |
|---|---|---|---|---|
| Sample | % dry-matter | $X_{10}$ (μm) | $X_{50}$ (μm) | $X_{90}$ (μm) |
| Raw material | | 90 | 358 | 508 |
| 1 | 99.91 | 3 | 25 | 161 |
| 2 | 99.98 | 3 | 26 | 196 |
| 3 | 99.97 | 4 | 51 | 285 |
| 4 | 99.97 | 4 | 45 | 282 |

Example 9. Drying and Comminution of Vortioxetine HBr

The experiment was carried out essentially as described for example 1 with difference in experimental setup as outlined below. A set of four experiments were carried out to investigate drying and comminuting larger portions of vortioxetine HBr suspended in toluene (40 g, 60 g, 80 g and 100 g suspended in 80 mL toluene). To filter toluene from vortioxetine HBr, nitrogen at a 6 Nm³/h flowrate and 20° C. was used to create a 2 bar pressure difference over the filter. The same gas flow was then used to dry the filter cake for 30 seconds. Nitrogen gas at a 47 Nm³/h flowrate at approximately 70° C. was used to suspend vortioxetine HBr in a vortex which was sustained for 120 seconds before the chamber was emptied.

The Amounts of Vortioxetine HBr and Toluene Used at the Four Different Runs:

1. 40 g vortioxetine HBr and 80 mL toluene.
2. 60 g vortioxetine HBr and 80 mL toluene.
3. 80 g vortioxetine HBr and 80 mL toluene.
4. 100 g vortioxetine HBr and 80 mL toluene.

Dry-matter content was determined by weighing samples before and after placing them in an oven at 60° C. overnight. The particle size distribution (volume mean diameter) of feed material and the comminuted vortioxetine was determined by laser diffraction. The dry-matter content and the particle size distribution is shown in table 11

TABLE 11

Particle size distribution of feed material and comminuted vortioxetine and % dry-matter of comminuted vortioxetine.

| | | Particle size distribution | | |
|---|---|---|---|---|
| Sample | % dry-matter | $X_{10}$ (μm) | $X_{50}$ (μm) | $X_{90}$ (μm) |
| Feed material | | 90 | 358 | 508 |
| 1 | 99.92 | 3 | 20 | 140 |
| 2 | 99.95 | 3 | 25 | 241 |
| 3 | 99.94 | 3 | 30 | 247 |
| 4 | 99.96 | 3 | 20 | 170 |

Example 10 Qualitative Analysis of the Comminution of Vortioxetine HBr

Figure 3:
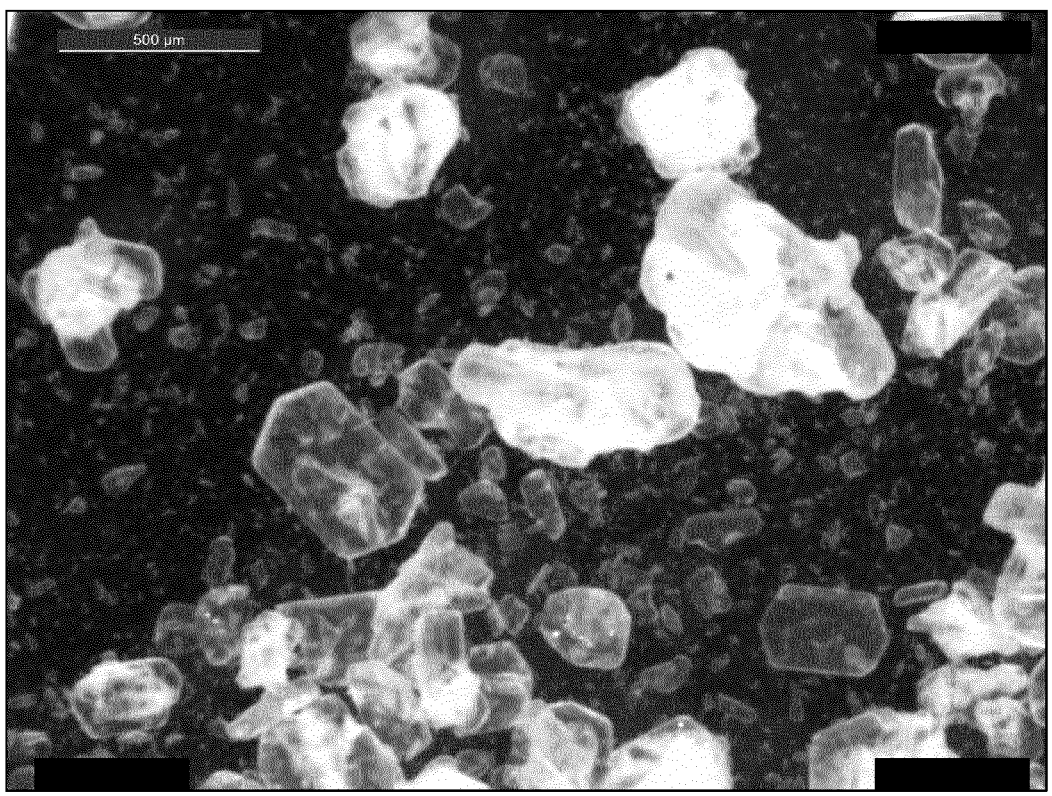
FIGS. 3 (a) and (b) show microscope pictures of untreated vortioxetine HBr.
Figure 3B:
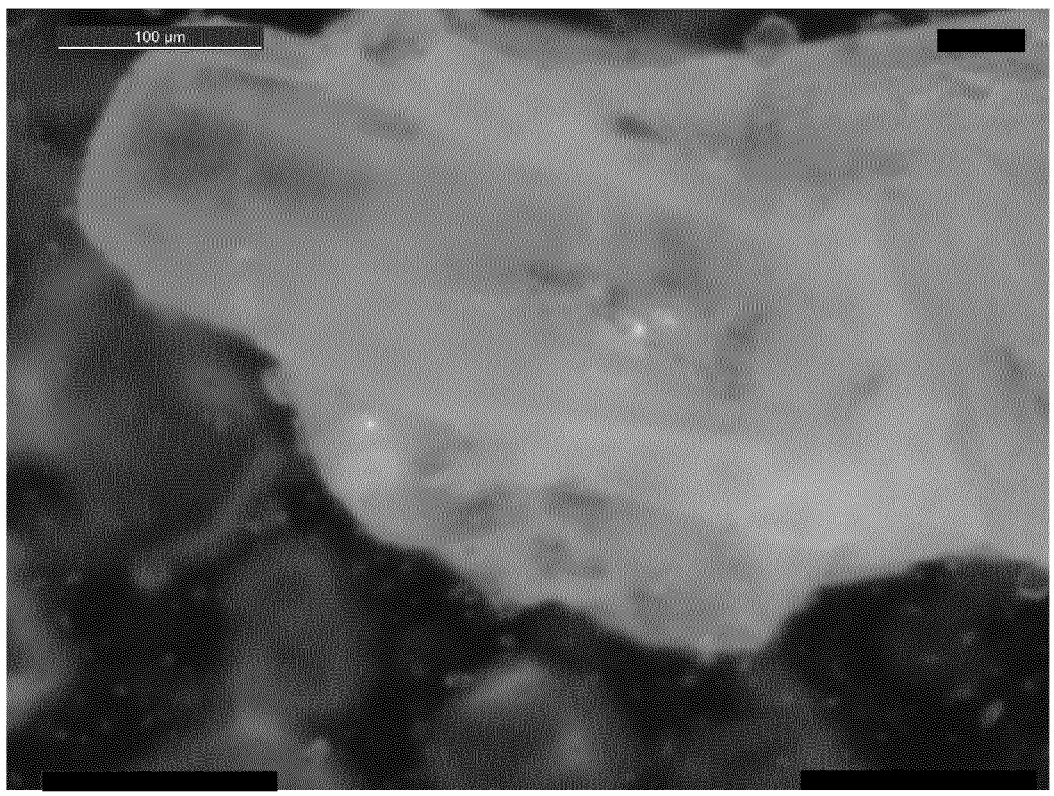
Figure 3C:
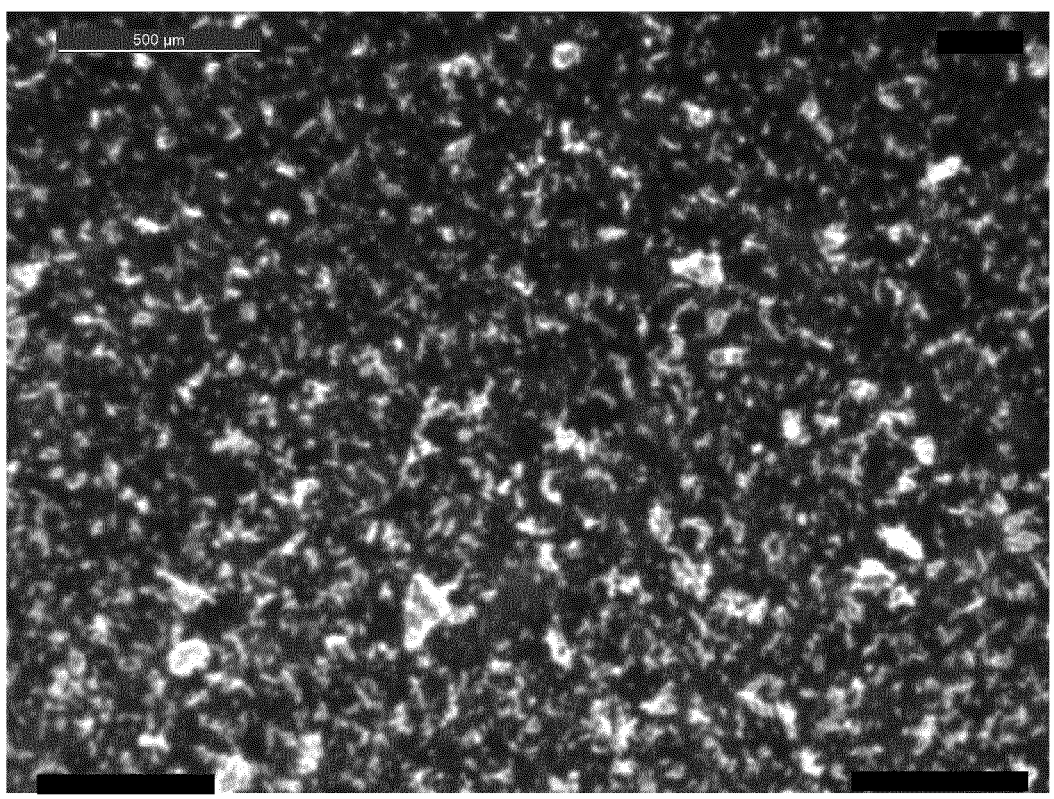
Figure 3D:
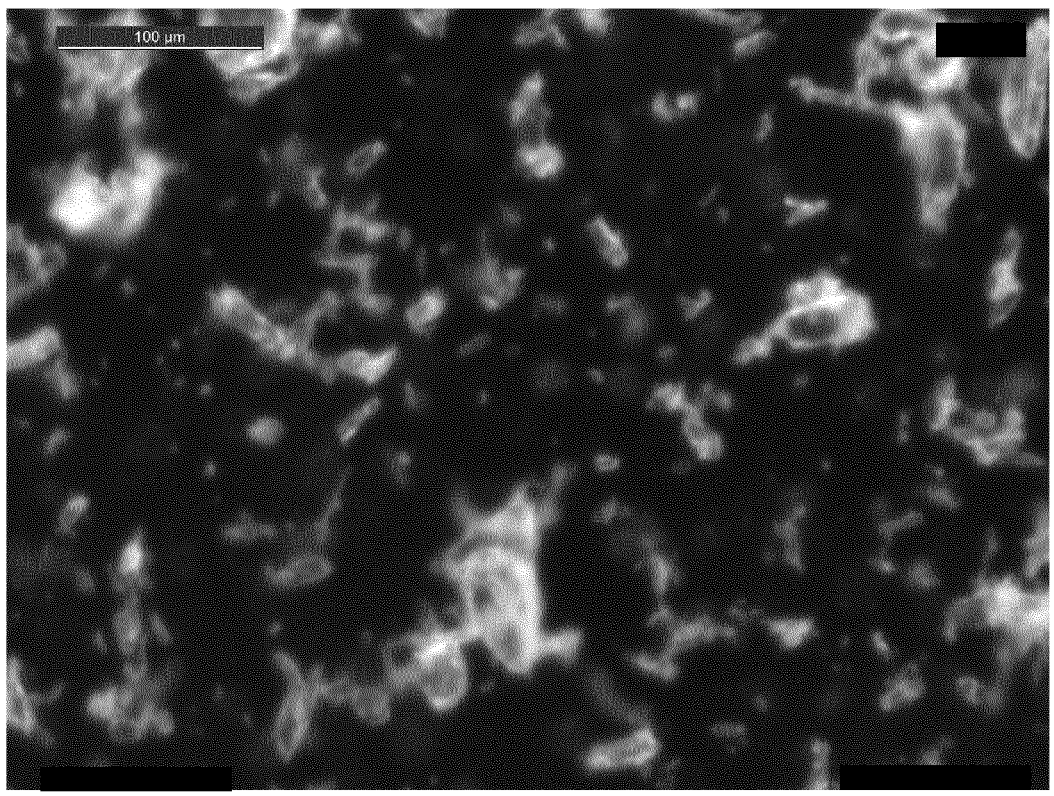
Figure 3E:
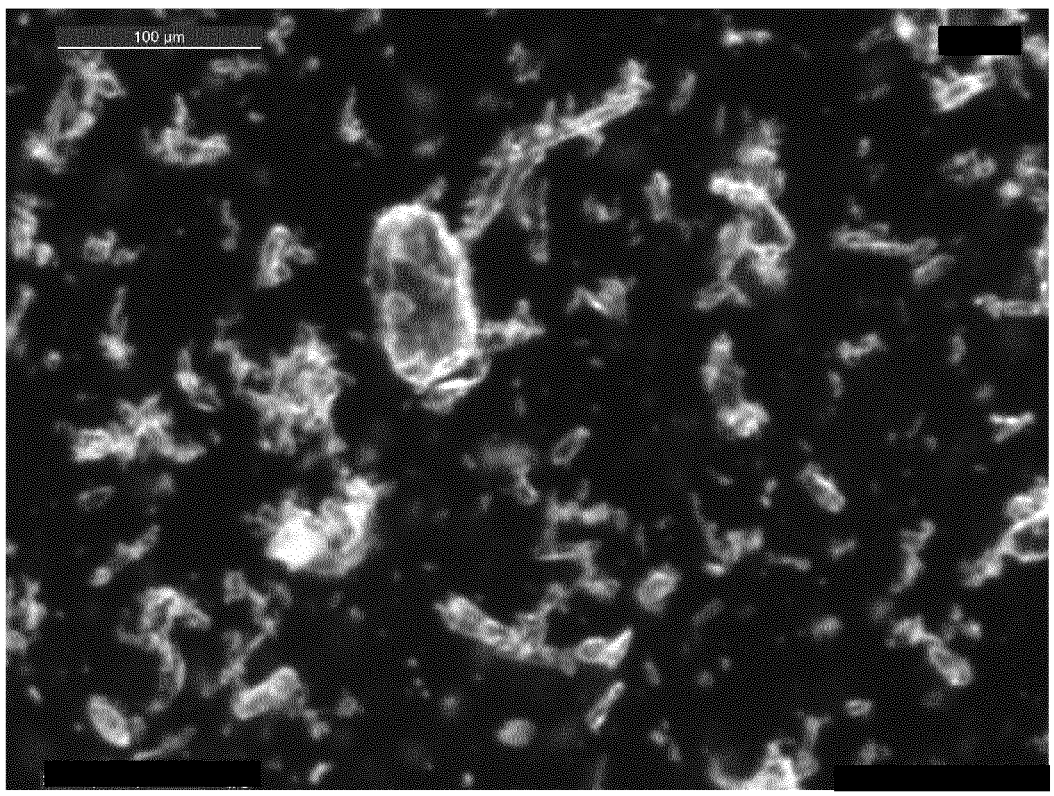
Figure 3F:
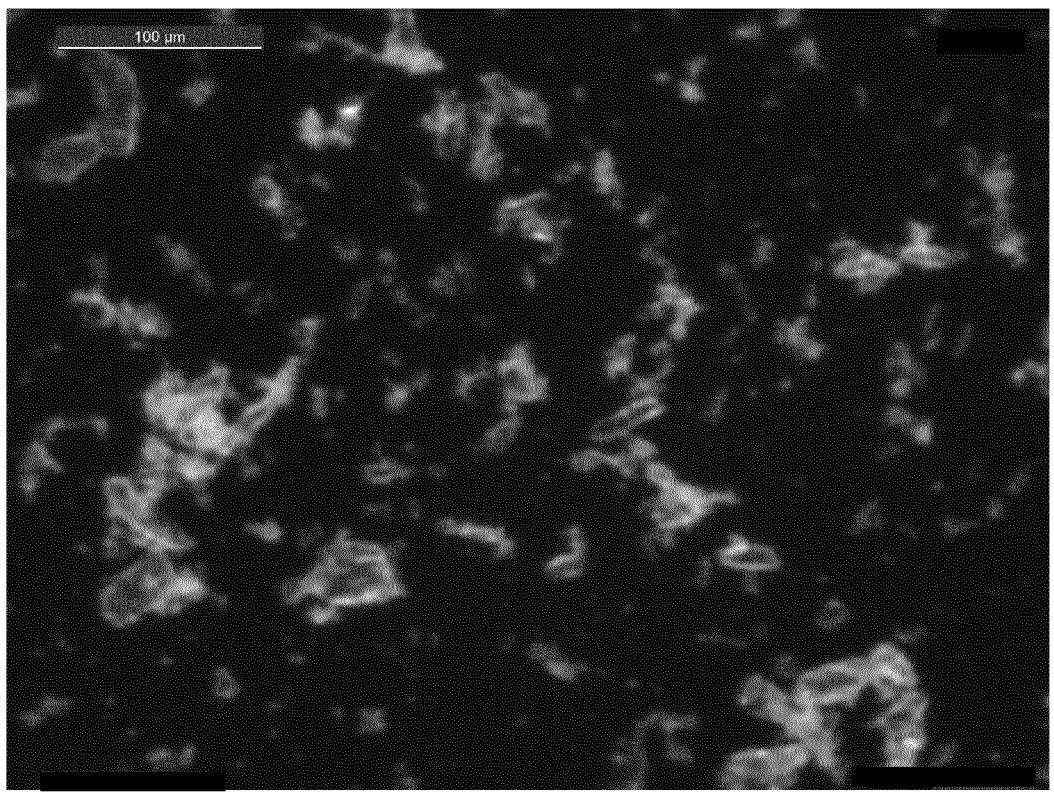

FIG. 3 shows microscope investigations of vortioxetine HBr before and after filtering, drying and comminution as described in the above examples. FIGS. 3 (a) and (b) are microscope pictures of untreated vortioxetine (raw material). The pictures show that untreated vortioxetine contains large particles and agglomerates. FIGS. 3 (c), (d), (a) and (f) are microscope pictures of filtered, dried and comminuted vortioxetine. These pictures demonstrate a marked reduction of the size of the particles. The pictures show that the feed material has been deagglomerated as well as micronized.

The invention claimed is:

1. Method for isolation and/or preparation of particles comprising the following steps:
    a) Providing a feed material comprising particles to be isolated and/or prepared in a chamber provided with a filter having a filter surface, optionally introducing liquid before, during or after the feed material is placed in the chamber;
    b) If the material in the chamber from step a) contains liquid, the feed material is filtered by draining out said liquid through an outlet for filtrate leaving retentate on the filter surface;
    c) Directing more than one gas jet towards the feed material from step a) or the retentate from step b) loosening the material from the retentate side of the filter surface;
    d) Removing the loosened material through an outlet for loosened material, wherein said more than one gas jet is provided from more than one gas inlet placed on the retentate side of the filter surface; wherein at least one gas jet contributes to create a vortex of gas and particles inside the chamber by directing a flow of gas sufficiently off-centre of the chamber; and wherein the loosened material is suspended in the gas from said gas jet and carried from the filter surface to the outlet for loosened material by the gas of said gas jet.

2. Method according to claim 1, wherein
    c) at least one or more gas jet is provided on the retenate side of the filter which is not contributing to creating a vortex inside the chamber.

3. Method according to claim 2, wherein at least one gas jet is directed towards retentate side of the filter surface in an angle pointing towards the filter surface or pointing towards the centre of the chamber in an angle approximately parallel to the filter surface.

4. Method according to claim 1, wherein
    a) liquid is introduced before, during or after provision of the feed material and at least one gas jet provides agitation of the liquid suspension of material to be filtered.

5. Method according to claim 1, wherein
    c) the flow (F) of gas from at least one gas jet is added in a direction tangential to a circle having a radius $r_f$ between $0.3 \cdot r_{min}$ and $0.9 \cdot r_{min}$.

6. An apparatus comprising a chamber (1), the chamber (1) comprises an inlet (2) for feed material to be isolated and/or prepared in the form of a slurry or a particular material, optionally an inlet for liquid, a filter having a filter surface (3) on which surface material (8) is positioned at least during use of the apparatus, an outlet (4) for filtrate, an outlet (5) for prepared particles comprising an opening (5a) to a passage through a wall of the chamber (1), more than one gas inlet (6, 9) placed on the retentate side of the filter through which gas jets are provided, characterized in that the more than one inlet (6, 9) is configured to direct a flow (F) of gas in form of a gas jet towards the material (8) on the filter surface (3) thereby loosening the material from the filter surface; wherein at least one gas inlet (6) is configured to direct a flow (F) of gas in form of a gas jet approximately parallel to the filter surface (3) within distance $h_i$ from the filter surface (3) and to direct the flow (F) of gas sufficiently off-centre (C) of the chamber, where the centre (C) is defined as a central axis of the chamber (1), to create a vortex inside the chamber (1) when the material (8) has been suspended.

7. Apparatus according to the claim 6, wherein the chamber (1) is formed like a cylinder or like a truncated cone, or the chamber (1) has an oval cross section or the cross section of the chamber (1) has no corners with an angle of 90° or below.

8. Apparatus according to the claim 6, wherein the inlet (6) for drying gas is configured to direct a gas jet tangentially to a circle having a radius $r_f$ smaller than the smallest distance $r_{min}$ between the central axis C and an inner wall of the chamber (1) and larger than 0.

9. Apparatus according to the claim 6, wherein the inlet (6) for gas is configured to direct a gas jet tangentially to a circle having a radius $r_f$ between $0.3 \cdot r_{min}$ and $0.9 \cdot r_{min}$.

10. Apparatus according to the claim 6, wherein the chamber (1) comprises more than one opening (5*a*) for dried product (5*a*) positioned at varying distance from the filter surface (3) and/or the chamber (1) comprises one or more openings (5*a*) which can be moved axially thereby varying the distance between the opening of the outlet (5) and the filter surface (3).

11. Apparatus according to the claim 6, wherein the chamber (1) comprises more than one opening (5*a*) for dried product (5*a*) positioned at varying distance from the central axis C and/or the chamber (1) comprises one or more openings (5*a*) which can be moved radially thereby varying the distance between the opening of the outlet (5) and the central axis C of the chamber (1).

12. Apparatus according to the claim 6, which apparatus comprises an inlet (2) for liquid.

13. Apparatus according to the claim 6, wherein the chamber (1) comprises more than one tangential inlet (6) for gas.

14. Apparatus according to the claim 6, wherein the apparatus is further provided with an inlet (9) for gas jet directed to the centre C of the chamber (1).

15. Apparatus according to the claim 6, wherein the gas inlets (6, 9) are placed at the end of the chamber (1) closest to the retentate side of the filter surface (3), optionally through the wall of the chamber (1) at a height $h_j$ above the filter surface (3).

16. Apparatus according to the claim 6, wherein an outlet (7) for gas is placed at the center or off-center of the chamber with an opening above the filter surface (3).

17. Apparatus for isolation and/or preparation of a suspended material according to the claim 6, which apparatus comprises more than one chamber (1).

18. Use of an apparatus according to the claim 6 for controlling drying and/or granulometry of loosened particulate material in a single chamber (1) or in a number of parallel chambers in order to obtain a target-degree of drying and a target-particle size distribution.

19. Use of an apparatus according to the claim 6 for controlling drying and/or granulometry of a loosened particulate material in a chamber (1) or in a number of parallel chambers by providing at least one gas jets (6) causing a vortex and then controlling temperature of the gas jet, retention time of the loosened particulate material in the chamber (1), velocity of the gas flow and amount of inflowing gas in such a way that target degree of drying and a target-particle size distribution of the loosened particulate material is obtained.

* * * * *

UNITED STATES PATENT AND TRADEMARK OFFICE
CERTIFICATE OF CORRECTION

| | |
|---|---|
| PATENT NO. | : 11,549,871 B2 |
| APPLICATION NO. | : 16/500973 |
| DATED | : January 10, 2023 |
| INVENTOR(S) | : Steen Sogaard et al. |

It is certified that error appears in the above-identified patent and that said Letters Patent is hereby corrected as shown below:

On the Title Page

(30) Foreign Application Priority Data should read:
"Apr. 7, 2017 (DK)............................PA201700244"

In the Claims

Claim 6, Column 20, Line 63:
"parallel to the filter surface (3) within distance $h_i$"
Should read:
"parallel to the filter surface (3) within distance $h_j$"

Signed and Sealed this
Twenty-first Day of February, 2023

Katherine Kelly Vidal
*Director of the United States Patent and Trademark Office*